2,976,639

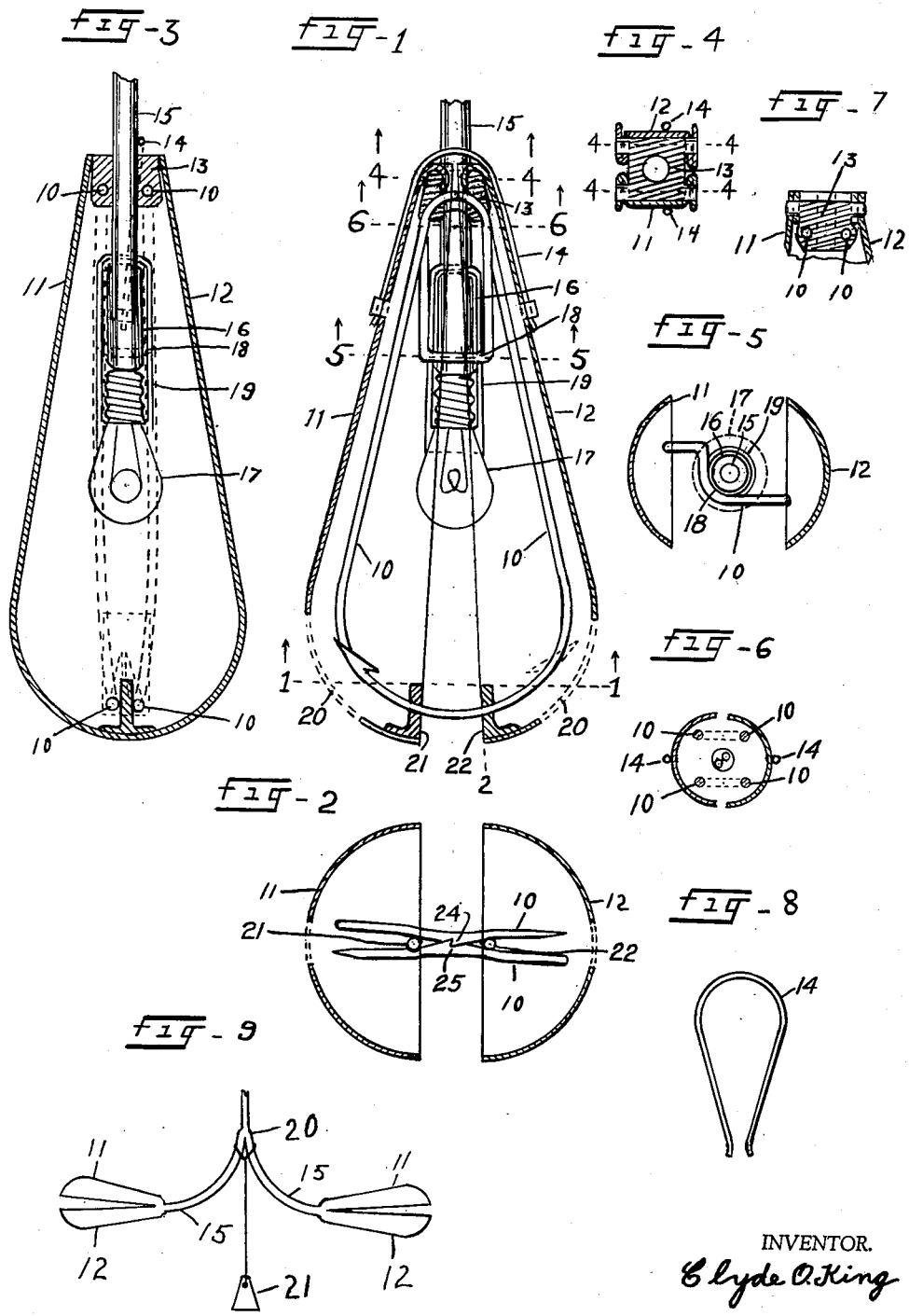

SNAP PIERCE FISH HOOK ASSEMBLY

Clyde O. King, 2120 K St., San Diego 2, Calif.

Filed Sept. 24, 1957, Ser. No. 685,987

2 Claims. (Cl. 43—17.6)

This invention relates to fish lures wherein the lure is constructed to contain the hooks inside a clam-like shell, one of the objects being to prevent the hooks from being caught on weeds or the like. Additionally, the stated construction effectively prevents the nibbling and taking of the bait by small fish with the attendant trouble involved in replacing it. By locating the bait inside a clam shell, it is temporarily protected until the arrival of a large fish which might take the entire lure in its mouth. Thus the catching of large fish is an object of the invention.

The clam shell-like sections of the device enclose two hooks, each one biased to spring outwardly in opposite directions through the respective halves of the shell when the said halves are squeezed together by a fish which has taken the lure in its mouth. The squeezing of the shell halves releases the hooks which have been held under spring tension, and they instantly pierce the fish's mouth from above and below. This is an advantage over single hook constructions since the latter, if the hook does not embed itself in the fish's flesh, will permit escape of the fish as the hook is torn away.

To insure operation in which the hooks enter in the above stated manner, the hooks are oriented in the cam-like shells so as to extend in a generally vertical plane, and thus when sprung will engage the upper and lower portions of the fish's mouth, assuming the fish is in an upright position when the lure is taken.

Since fish are known to be attracted to light, a small electric light is housed in the lure to take advantage of this phenomenon.

In the drawings, which give a better understanding of the lure make-up,

Fig. 1 is a vertical section through the lure in set position;

Fig. 2 is a section taken on line 1—1 of Fig. 1 showing the shell halves and the lower portion of the hooks in set position;

Fig. 3 is a vertical section taken in a plane 90° displaced from that of Fig. 1;

Fig. 4 is a sectional view taken on line 4—4 of Fig. 1;

Fig. 5 is a sectional view on line 5—5 of Fig. 1;

Fig. 6 is a sectional view on line 6—6 of Fig. 1;

Fig. 7 is a vertical sectional view taken at the top portion of the lure;

Fig. 8 is a separate view of the spring which is responsible for urging the shells into closed relationship;

Fig. 9 is a schematic view of two sets of the lure suspended from a line and having an anchor locating the lures horizontally at a desired distance or hight in the water.

Referring to the figures, the device comprises two clamp-like shell sections 11, 12 hingedly secured at their upper marginal edge to a small substantially rectangular anchor block element 13. The sections 11, 12 are biased toward each other by an inverted U-shaped light spring 14, shown in Fig. 8, which is mounted and secured at the upper part of those sections, as shown in Fig. 1. Mounted within the sections 11, 12 are a pair of barbed hooks 10, 10 lying side-by-side but extending in opposite directions and integrally connected by a wire coil spring which extends through two substantially parallel horizontal openings in the anchor block. The bight of each of the hooks is provided with a projection 24 (Fig. 2) the arrangement being such that when in engagement they are adapted to hold the hooks in set position against the action of the coil spring within the confines of the shells. Each of the shells is provided at its lower portion with a vertical slot 20, 20 through which the barbs of the hooks are adapted to extend when sprung. Two small vertical posts 21, 22 are mounted on the lower portions of each of the shells at substantially the mid-point thereof, said posts lying between the bight of each hook and contacting the same on opposite sides of the area of interengagement when the hooks are in "set" position. A combination electric wire and fishing line 15 extends through a vertical slot in the anchor block which carries a socket 16 and electric bulb 17 mounted therein. Sealing the light within the socket is a tubular insulation member 19 with at one end contacts the upper part of the light and at its other is mounted on the anchor block. For rigidity the upper portion of the socket is brazed to the spring loop at 18.

In operation, when a relatively large fish attracted by the light "takes" the lure, the two clam-like shell halves are squeezed toward one another, the posts thereon engaging the inclined surfaces leading to the interengaging projections, cam the hooks apart so that they are forced, under the action of the coil spring, through the slots in the shells, into engagement with the fish's mouth.

I claim:

1. A fish lure comprising a body portion including two half shells the upper end of each being secured in an anchor block, the said shells also being connected adjacent their upper ends by an inverted U-shaped hair spring, the said shells being provided with two aligned centrally disposed elongated slots adjacent their lower ends, two fish hooks mounted within the shells in overlying relationship with their shanks disposed generally parallel to the inner side walls of the shells and with their points facing in opposite directions, the bight and points of the said hooks being adapted to be forced through the said slots in the shells, the upper portion of the hooks being connected by an intermediate section also mounted in the block and being defined by a plurality of U-shaped bends affording a spring action between the hooks of such nature as to bias the said hooks apart, the lower portion of each of the hooks in the bight section being provided with a sawtooth like projection and recess, the projection of one being adapted to be engaged in the recess of the other to thus lock the hooks in "set" position within the confines of the shell, each of the lower inside terminal portions of the shells being provided with a centrally disposed, narrow upstanding pin adapted to be located between and in contact with the two hooks outward of the projections, the arrangement being such that in set position, a bite on the lure will occasion a slight movement of the shells and their pins toward each other and result in a camming action of the pins on the hook projections to force the said hooks out of engagement with each other, the said hooks then being projected outwardly through the slots in the shells.

2. A fish lure as set forth in claim 1, the said anchor block being provided with a central aperture, in which an electric wire is disposed, the said wire carrying a socket and lamp located within the lure to provide illumination thereof.

References Cited in the file of this patent

UNITED STATES PATENTS

| 1,079,891 | Simms | Nov. 25, 1913 |
| 1,159,278 | Sampey | Nov. 2, 1915 |
| 2,381,279 | Haberkorn | Aug. 7, 1945 |
| 2,508,560 | Adams | May 23, 1950 |

FOREIGN PATENTS

| 32,362 | Sweden | Feb. 3, 1911 |